United States Patent [19]
Kikuchi et al.

[11] Patent Number: 4,738,612
[45] Date of Patent: Apr. 19, 1988

[54] PIVOTABLE BLOW-MOLDING APPARATUS FOR MOLDING HOLLOW ARTICLES OF SYNTHETIC RESIN

[75] Inventors: Masanori Kikuchi, Hasuda; Kazutosi Nagahori, Ageo; Shigeharu Tanaka, Kawagoe, all of Japan

[73] Assignees: Placo Co., Ltd., Saitama; Mitoyo Plastic Co., Ltd., Chiba, both of Japan

[21] Appl. No.: 81,005

[22] Filed: Aug. 3, 1987

[30] Foreign Application Priority Data

Aug. 9, 1986 [JP] Japan .............................. 61-122353[U]
Oct. 9, 1986 [JP] Japan .............................. 61-155128[U]
Mar. 10, 1987 [JP] Japan .............................. 62-34882[U]

[51] Int. Cl.⁴ ................................................ B29C 49/04
[52] U.S. Cl. .................................... 425/532; 264/540; 264/543; 425/539; 425/540; 425/541
[58] Field of Search ................ 264/540, 543; 425/150, 425/522, 532, 539, 541, 540

[56] References Cited

U.S. PATENT DOCUMENTS 4,239,474 12/1980 Nakagawa .......................... 264/540
4,362,688 12/1982 Nakagawa .......................... 264/540

FOREIGN PATENT DOCUMENTS

101026 2/1965 Denmark ........................... 425/541
45-31397 10/1970 Japan .
49-18748 5/1974 Japan .
53-56262 5/1978 Japan .
54-15580 6/1979 Japan .
55-21239 2/1980 Japan .

Primary Examiner—Jay H. Woo
Assistant Examiner—Timothy W. Heitbrink
Attorney, Agent, or Firm—Nixon & Vanderhye

[57] ABSTRACT

A blow-molding apparatus for molding hollow articles is disclosed, which comprises a base member, and a platform mounted thereon. An extruder is provided which has a nozzle located above the platform. Bearings are attached to the upper surface of the platform, and support a shaft. A mold opening/closing device is pivotable mounted on the shaft, and comprises a main body, a pair of mold halves supported by the main body, and a mold-moving unit for moving the molds toward and away from each other. The apparatus further comprises a device for rotating the mold opening/closing device around the shaft, thereby to incline the device at an angle, within a predetermined range, to the horizontal plane. Thus, both mold halves can be inclined, thereby forming an inclined cavity when they are clamped together. A parison can be supplied smoothly from the nozzle into the inclined cavity, under its own weight.

10 Claims, 9 Drawing Sheets

PIVOTABLE BLOW-MOLDING APPARATUS FOR MOLDING HOLLOW ARTICLES OF SYNTHETIC RESIN

BACKGROUND OF THE INVENTION

A. Field of the Invention

The present invention relates to a blow-molding apparatus for molding hollow articles made of synthetic resin and, more particularly, to an apparatus which can mold not only bottles of ordinary shapes, but also hollow articles of complex shapes, such as tanks, bent pipes, bent ducts, and double-walled cases.

B. Description of the Prior Art

Hollow articles of synthetic resin, such as bottles and tanks, made by the typical blow molding method, and an apparatus for molding such hollow articles, are disclosed in, for example, Japanese Patent Publication No. 45-31397. Hollow, double-wall articles, such as attache cases and cases for musical instruments, are disclosed in, for example, Japanese Patent Publication No. 49-18748. Further, apparatuses for manufacturing long pipes and long vessels are known.

The apparatuses described in the preceding paragraphs are suitable for manufacturing bottles, tanks, hollow, double-wall articles, long pipes, or the like. However, in order to produce hollow articles, such as pipes, ducts and bottles, which are bent in a complex way, these apparatuses require the assistance of handwork for guiding a parison from a nozzle into the bent cavity of a metal mold.

Recently an apparatus has been developed which can manufacture long, bent, tubular articles, such as bent pipes and bent ducts, without forming flashing or burrs. This apparatus is disclosed in Japanese Patent Disclosure (Kokai) No. 55-21239. The apparatus comprises an extruder having a die head, two lower mold halves attached to a turntable, and a mold opening/closing device. The lower mold halves can be moved between a position below the die head and another position below the mold opening/closing device. A parison is supplied from the extruder into the bending groove cut in the lower mold half. While the parison is being supplied into the groove, the motor for moving the die head is controlled, thereby moving the die head back and forth, and left to right and vice versa, in a horizontal plane, and also up and down such that the distance between the die head and the bottom of the groove is maintained constant. Thus, with this apparatus, it is possible to guide a parison smoothly into the bending groove cut in the lower mold half.

In the apparatus, however, a great power is required to drive the turntable and to move the die head. The apparatus also needs drive mechanisms for rotating the turntable and for moving the die head, and is complicated in structure and inevitably has a large body. In addition, the die head should be moved with high precision in order to guide the half-molten parison from the nozzle, and smoothly through the bending groove. Hence, the apparatus should be equipped with a control device for controlling the die head, and this is inevitably expensive.

Japanese Patent Disclosure (Kokai) No. 53-56262 discloses a molding apparatus wherein a horizontal nozzle for extruding a parison is completely fixed, and a lower mold is moved back and forth, and left to right and vice versa, in a horizontal plane, and also up and down, thereby guiding a parison into the bending groove cut in the lower mold. While the lower mold is moved up and down, the distance between the die head and the bottom of the groove is maintained constant. Since the nozzle is arranged horizontally, the half-molten parison will likely flow downward as soon as it is extruded from the nozzle, whereby its wall fuses before the blow-molding is started. Further, it takes much time to set the lower mold in the correct starting position before the parison is supplied into the complicatedly-shaped groove of the lower mold. In addition, with this apparatus, a parison cannot be efficiently guided through the mold groove.

In the apparatus described above, the mold groove also extends horizontally. Therefore, that portion of the parison which contacts the groove wall for a longer time hardens more quickly than the other portion. Consequently, the parison as a whole does not expand uniformly when pressurized air is blown into it, and the resultant blow-molded article fails to have a uniform wall thickness.

SUMMARY OF THE INVENTION

The object of the present invention is to provide an apparatus for blow-molding various hollow articles made of synthetic resin, including not only hollow articles of relatively simple shapes, but also hollow articles haviing complex shapes and uniform wall thickness, such as long, thin bent pipes, without forming flashing.

The object is achieved by an apparatus which comprises a base member, a platform mounted on the base member, and an extruder having a nozzle. The nozzle is located above the platform. Bearings are attached to the upper surface of platform. A shaft is supported by these bearings. The apparatus further comprises a mold opening/closing device having a main body, a pair of mold halves supported by the main body, and a mold-moving unit for moving these mold halves back and forth, to alternately open and close them. This device is pivotably attached to the shaft. Still further, the apparatus comprises a device for pivoting the mold opening/closing device around the shaft, thereby inclining the device to the horizontal plane at a suitable angle within a specific range.

When the mold opening/closing device is inclined at an angle to the horizontal plane, the cavity defined by the mold halves, which are clamped together, is also inclined at this angle. When the cavity is thus inclined, a soft parison can be fed smoothly under its own weight, into the cavity, even if the molds have matching surfaces of complex shapes, or if the mold cavity is defined by grooves asymmetric to each other. Therefore, the blow-molding apparatus of this invention can easily and accurately produce hollow articles of complex shapes which cannot be manufactured by the conventional blow-molding apparatuses.

The molds are preferably, or rather must be, inclined at an angle, unless the parting line of molds is straight and unless the shape of molded products is horizontally symmetrical to the parting line. The most suitable angle at which the molds are to be inclined should be determined according to the shape of molded products.

The lower mold is positioned and inclined at such an angle to the horizontal plane that the groove cut in the lower mold is located below the nozzle. Then, a parison is extruded from the nozzle into the groove. The parison moves smoothly down along the groove, under its own weight. Draw-down of the parison can therefore be prevented, and thus, the parison can be blow-molded into a hollow article having a uniform wall thickness.

Draw-down of the parison may be positively induced by adjusting the angle of inclination of the molds and controlling the supply of the parison, thereby to produce a hollow article having a thin wall. In other words, draw-down is caused to reduce the wall thickness of the hollow article, in order to minimize the material cost.

According to the invention, the lower mold can be moved on a plate inclined to the horizontal plane, while a parison is being supplied into the groove of this mold. This method enables the parison to be guided accurately into the groove, even if the groove has a complex shape. Thus, when the parison is blow-molded after the upper mold has been clamped to the lower mold, and the parison has been thus held within the cavity defined by these molds, a hollow article without flashing along its parting line will be produced. Since there is no flashing formed on the article, material can be saved, and the article need not be subjected to flashing removing, i.e., a secondary finishing process. As a result, the cost of manufacturing the article can be reduced.

The lower mold can be moved on the plate such that a hollow article having flashing along at desired portions. This flashing may then be machined into brackets formed integrally with the article.

Further, the lower mold can be moved linearly on the inclined plate, thereby to form a double-walled case with high accuracy and high efficiency.

Still further, the mold opening/closing device is horizontally positioned, i.e., not inclined at all, in which case, the apparatus of the invention functions as an ordinary blow-molding apparatus for manufacturing hollow articles of relatively simple shapes.

DETAILED DESCRIPTION OF THE PREFERRED EMBODIMENTS

Embodiments of the present invention will now be described in detail, with reference to the accompanying drawings.

Figure 1:
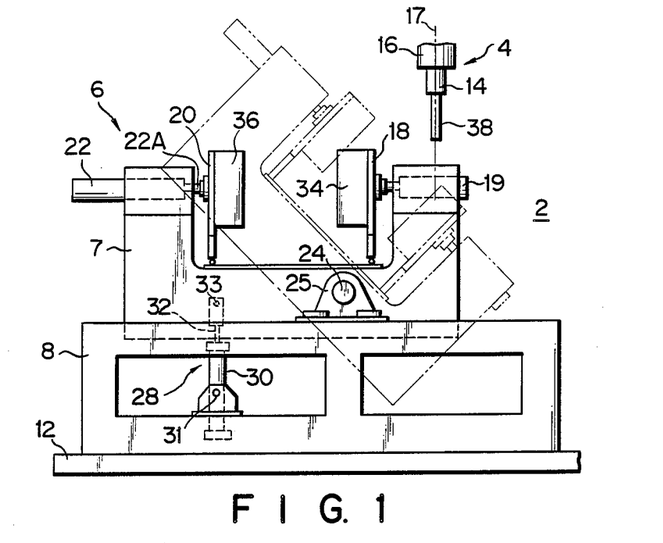
FIG. 1 is a front view of an apparatus according to a first embodiment of the present invention.
Figure 2:
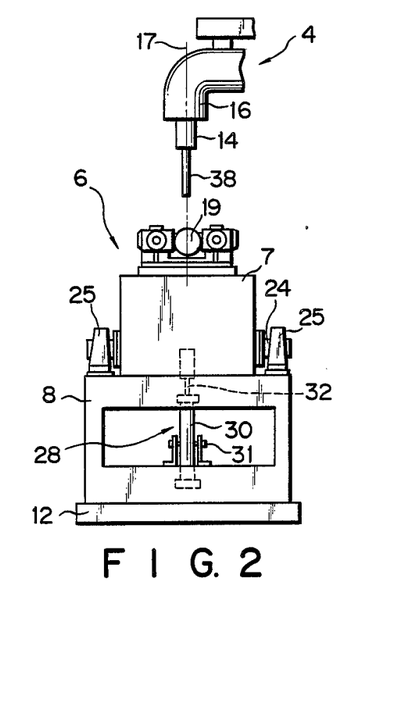
FIG. 2 is a side view of the apparatus shown in FIG. 1.

FIGS. 1 and 2 show blow-molding apparatus 2 according to a first embodiment of the present invention. This apparatus comprises extruder 4 for extruding molten synthetic resin, mold opening/closing device 6 having a pair of parison-blowing molds, and platform 8 supporting mold opening/closing device 6. Platform 8 is secured to base 12. Extruder 4 has die head 16. Nozzle 14 for extruding a parison extends downwardly from the distal end of die head 16.

Mold opening/closing device 6 comprises main body 7 which appears substantially U-shaped when viewed from the front, plate 18 for holding a lower mold, and plate 20 for holding an upper mold. Plate 20 is located close to one side wall of main body 7, and opposes plate 18. Plate 20 is coupled to the distal end of rod 22A of hydraulic cylinder device 22 provided for moving plate 20 toward and away from plate 18. Plate 18 is positioned near the other side wall of main body 7, and opposes plate 20. Plate 18 is connected to position-adjusting mechanism 19, which is attached to the other side wall of main body 7 for moving plate 18, thereby changing the position at which the molds are clamped together or separated from each other. In other words, mechanism 19 can adjust the position of plate 18 with respect to nozzle 14. One mold half, or upper mold 36, is attached to plate 20, and the other mold half, or lower mold 34, is attached to plate 18.

Shaft 24 is horizontally supported by a pair of bearings 25 provided on platform 8 secured to base 12. Shaft 24 extends at right angles to the lengthwise direction of mold opening/closing device 6. Device 6 is pivotably mounted on shaft 24. Hydraulic cylinder device 28 is provided beneath mold opening/closing device 6, for the purpose of inclining device 6. Cylinder 30 of device 28 is linked to base 8 by means of pin 31. The upper end of piston rod 32 of device 28 is linked by pin 33 to the bottom of main body 7, at an appropriate distance from shaft 24. Hence, when hydraulic cylinder device 28 is operated, mold opening/closing device 6 can be moved between the horizontal position indicated by the solid lines in FIG. 1, and the inclined position represented by the two-dot, one-dash lines in FIG. 1. If necessary, device 6 can be pivoted or rocked around shaft 24. Shaft 24 is located close to lower mold 34, which is positioned lower than upper mold 36 when device 6 is inclined.

The operation of the blow-molding apparatus described above will now be explained.

Lower mold 34 and upper mold 36 are fastened to plates 18 and 20, respectively, by means of bolts or the like. Molds 34 and 36 have grooves which define the cavity of a shape identical to that of a hollow, blow-molded article, when molds 34 and 36 are clamped together.

Figure 3:
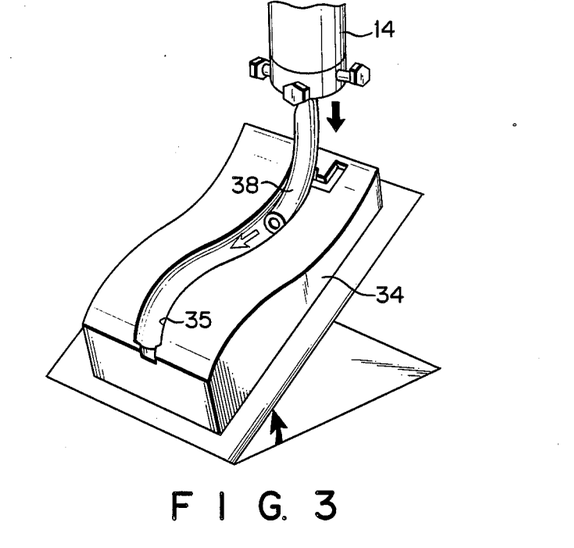
FIGS. 3 and 4 are perspective views showing parisons being supplied into the grooves cut in lower molds inclined at predetermined angles to the horizontal plane.

Then, hydraulic cylinder device 28 is operated, thereby moving mold opening/closing device 6 so that it is inclined an appropriate angle. In other words, device 6 is pivoted around shaft 24. As a result, molds 34 and 36, both attached to device 6, assume inclined positions, with mold 36 being located at a level higher than lower mold 34, mold 34 being positioned below nozzle 14. As is shown in FIG. 3, nozzle 14 extrudes parison 38 such that the lower end of parison 38 first enters the upper end of elongated groove 35 cut in the now-inclined mold 34.

Figure 4:
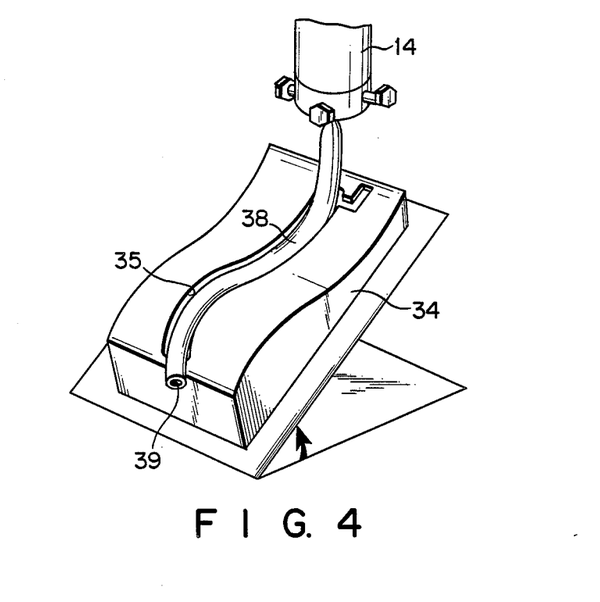

As nozzle 14 extrudes parison 38 further, parison 38 moves downwardly in and along groove 35, due to the downward force acting on it, in addition to its own weight. When parison 38 protrudes an appropriate distance from the lower end of groove 35, as is shown in FIG. 4, extruder 4 is stops operation, and the supply of parison 38 ceases. As a result, groove 25 is completely filled with parison 38.

Next, hydraulic cylinder device 22 is operated, thereby, moving upper mold 36 toward lower mold 34, and clamping both molds together. A groove (not shown), having a shape complementary to that of groove 35, is also cut in upper mold 36. Molds 34 and 36 thereby define a cavity having a shape identical to that of the desired hollow article. Molds 34 and 36 can be clamped together not only by hydraulic cylinder device 22, but also by mechanism 19, thereby moving both molds toward each other. Parison 38 is held within this cavity.

Thereafter, pressurized air is blown from an air nozzle (not shown) into parison 8 through the lower end thereof, which projects from molds 34 and 36 clamped together. Parison 38 is thereby expanded or inflated, and thus made into a hollow article having the desired shape. Parison 38 is then cut at the proximal end located below nozzle 14 of extruder 4.

Alternatively, parison 38 can be cut at a position close to nozzle 14 of extruder 4 when lower mold 34 and upper mold 36 are clamped together, parison 38 thus being held within the cavity defined by these molds. Pressurized air is then blown from an air nozzle (not shown) into parison 38, through the opening in the cut end of parison 38, thereby blow-molding the parison into a hollow article.

Finally, hydraulic cylinder device 22 is operated when air-blown parison 38 (i.e., the hollow article) is cooled. Upper mold 36 is therefore moved away from lower mold 34, thereby exposing the hollow article. The hollow article is then removed from lower mold 34.

Figure 5:
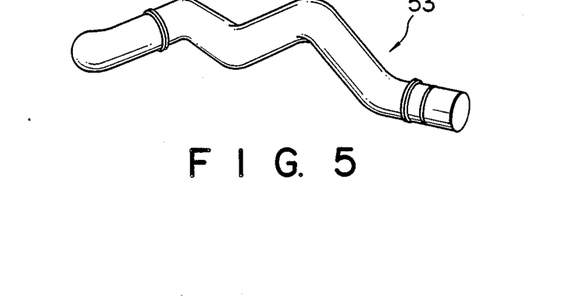
FIG. 5 is a perspective view of a hollow article made by the apparatus of FIG. 1, i.e., a long, bent pipe.

The apparatus shown in FIGS. 1 and 2 can, therefore, manufacture hollow article 53 having no flashing, as is shown in FIG. 5.

In order to produce a straight cylindrical vessel by blow-molding, the apparatus is operated in the following manner:

First, mold opening/closing device 6 is positioned horizontally. That is, device 6 is inclined at 0° to the horizontal plane.

Then, the position of lower mold 34 is adjusted such that the upper end of the cavity, which will be formed when molds 34 and 36 are clamped together, is located directly below nozzle 14. Mechanism 19 and hydraulic cylinder device 22 are driven, thereby moving lower mold 34 and upper mold 36 toward each other and clamping them together. Thereafter, the blow-molding commences.

An apparatus according to the second embodiment of this invention will now be described, with reference to FIGS. 6 and 7.

Figure 6:
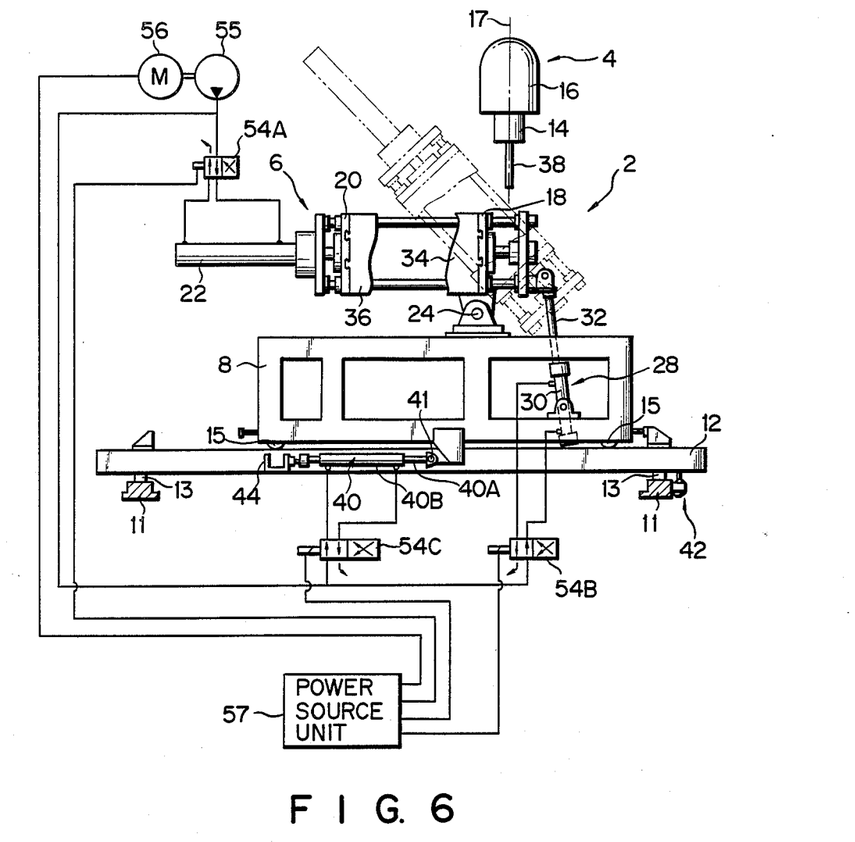
FIG. 6 is a front view of an apparatus according to a second embodiment of this invention.

As is shown in FIG. 6, a pair of parallel rails 11 are laid on a flat floor. Base 12 having wheels 13 is mounted on rails 11, and is thus movable in a direction perpendicular to the plane of the drawing (FIG. 6). Platform 8 having wheels 15 is mounted on base 12, and can move in a horizontal plane, in a direction at right angles to rails 11. Therefore, platform 8 can move in any direction in a horizontal plane perpendicular to the axis of nozzle 14. Hydraulic cylinder device 40, for driving paltform 8 in a horizontal plane, and in the direction perpendicular to rails 11, is provided between platform 8 and base 12. The distal end of piston rod 40A of device 40 is linked to platform 8 by pin 41. The rear end of cylinder 40B of device 40 is fixed to bracket 44 formed integrally with base 12. As is shown in FIG. 7, hydraulic cylinder device 42, which is designed to move platform 8 parallel to rails 11, is provided between base 12 and one of rails 11. The distal end of piston rod 42A of device 42 is linked to base 12 by pin 43. The rear end of cylinder 42B of device 42 is secured to bracket 46 formed integrally with one of rails 11.

Hydraulic cylinder devices 40 and 42 can be replaced by stepping motors.

Figure 7:
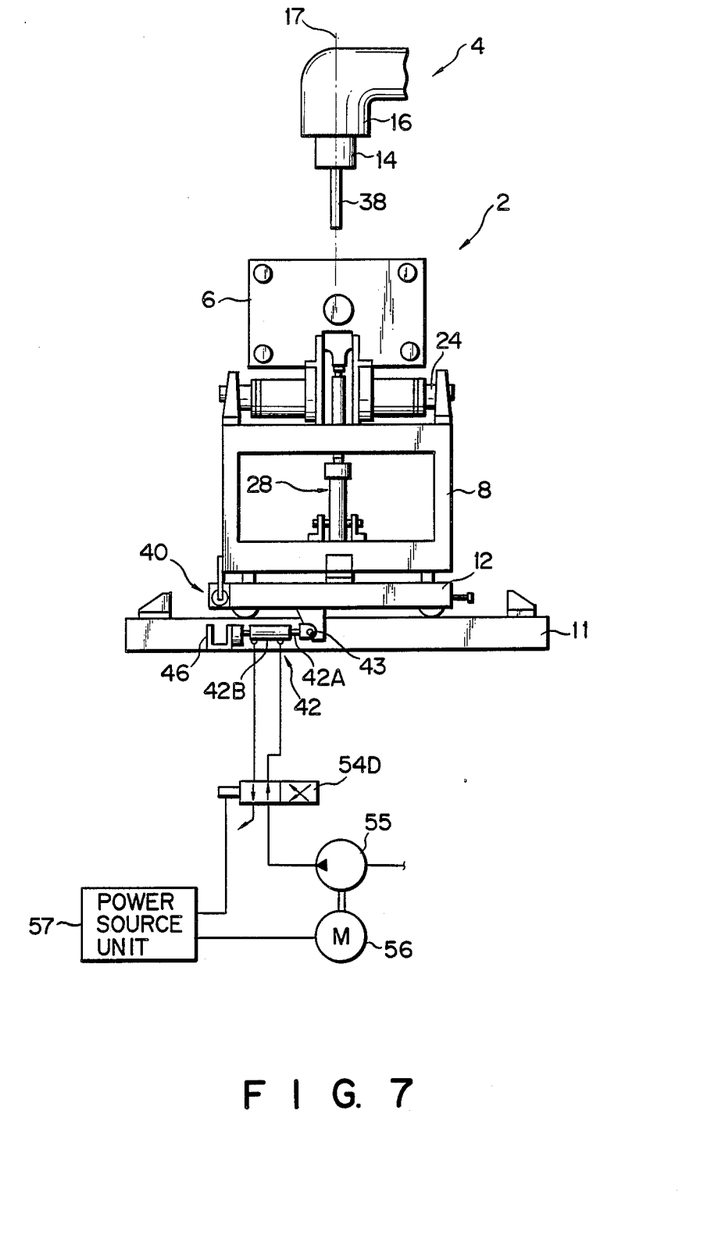
FIG. 7 is a side view of the apparatus shown in FIG. 6.

As is schematically illustrated in FIGS. 6 and 7, hydraulic cylinder devices 22, 28, 40, and 42 are connected to change-over valves 54A, 54B, 54C, and 54D, respectively. The inlet ports of these change-over valves are connected by pipes to hydraulic pump 55. Motor 56 is coupled to pump 55, for driving the same. Motor 56 and valves 54A, 54B, 54C, and 54D are connected to power source unit 57.

The operation of the blow-molding apparatus of the second embodiment will now be explained.

This blow-molding apparatus has rails 11, base 12, wheels 13 and 15, hydraulic cylinder devices 40 and 42, and units 55, 56, and 57 for driving these devices 40 and 42. These components effectively operate when the blow-molding apparatus is set in preparation for manufacturing hollow articles of a different shape. More specifically, these components cooperate to move platform 8, thereby positioning mold opening/closing device 6 at a distance from nozzle 14. Situated thus, both molds can be easily removed from device 6, and other upper and lower molds for blow-molding hollow articles of another shape can easily be attached to device 6, since mold-replacing is not hindered by nozzle 14.

After new molds have been attached to device 6 and fastened to each other, the cavity defined by the molds may be out of axial alignment with nozzle 14. This axial misalignment can be reduced by moving platform 8 by operating units 55, 56, and 57, and ultimately driving hydraulic cylinder devices 40 and 42.

Once lower mold 34 and upper mold 36 have been attached to plates 18 and 20, the blow-molding device of the second embodiment is operated in the same way as the apparatus of the first embodiment.

Another blow-molding apparatus, or a third embodiment of the present invention, will now be described, with reference to FIGS. 8 and 9.

Figure 8:
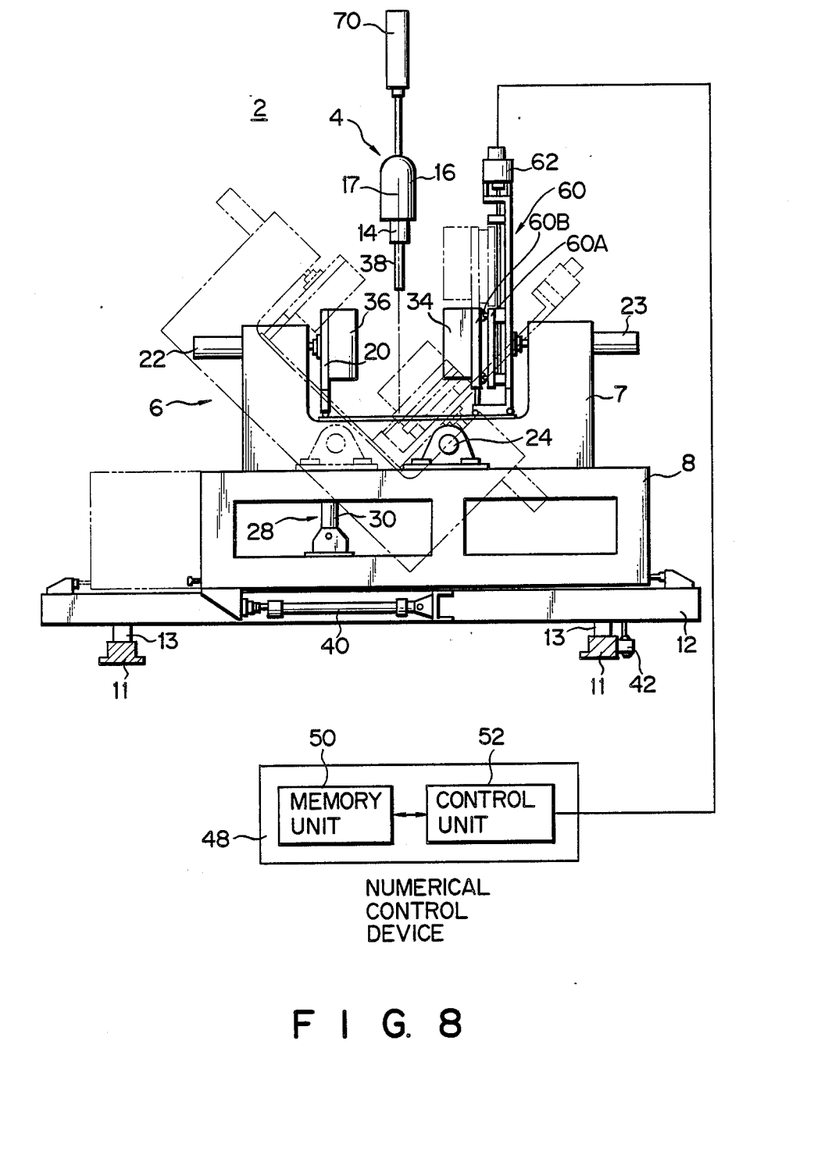
FIG. 8 is a front view of an apparatus according to a third embodiment of the invention.

As is shown in FIG. 8, a pair of parallel rails 11 are laid on a flat floor. Base 12 having wheels 13 is mounted on rails 11, and is thus movable parallel to rails 11. Platform 8 is mounted on base 12, and can move in a horizontal plane in the direction at right angles to rails 11. Hence, platform 8 can move in any direction in the horizontal plane, crossing at right angles to the axis of nozzle 14. Hydraulic cylinder device 40 is provided between platform 8 and base 12, for moving platform 8 in across rails 11. Further, hydraulic cylinder device 42 is provided between rails 11, on the one hand, and base 12, on the other, for moving platform 8 parallel to rails 11.

Drive units (not shown) are provided to drive hydraulic cylinder devices 40 and 42. These drive units are identical to those used in the second embodiment, and will therefore not be described. Hydraulic cylinder deices 40 and 42 can be replaced by stepping motors.

Hence, in the third embodiment of the invention, the position of platform 8 can be adjusted with respect to nozzle 14, prior to the commencement of blow-molding, and can be set at the optimum position immediately before the blow-molding begins.

Mold opening/closing device 6 comprises cross-table device 60 for holding lower mold 34, and plate 20 for holding upper mold 36. Plate 20 can move toward and away from cross table 60, to open and close the molds. Hydraulic cylinder device 22 is coupled to plate 20, to clamp upper mold 36 to lower mold 34 and to separate upper mold 36 from lower mold 34. Cross-table 60 is moved by drive devices 62 and 64 in any direction in a plane perpendicular to the axis of hydraulic cylinder device 22. Drive devices 62 and 64 are attached to the top and to one side of cross table 60, respectively. Hydraulic cylinder device 23 is provided for moving lower mold 34 toward and away from upper mold 36, to open and close the molds. Device 23 is coupled to the rear face of cross table 60. Table 60 is a known type, which is numerically controlled.

As is shown in FIG. 8, mold opening/closing device 6 is rotatably mounted on shaft 24. Hydraulic cylinder device 28 is arranged beneath device 6, in order to incline mold opening/closing device 6. Device 28 comprises cylinder 30 and a piston rod. Cylinder 30 is linked to platform 8 by a pin. The distal end of the piston rod is linked by a pin to main body 7 of mold opening/closing device 6. Therefore, device 6 can be moved between the horizontal position indicated by the solid lines in FIG. 8 and the inclined position represented by the two-dot, one-dash lines in FIG. 8. (In the horizontal position, device 6 extends parallel to base 12, and perpendicular to axis 17 of nozzle 14.) Shaft 24 is secured to main body 7 of mold opening/closing device 6, and is positioned close to lower mold 34 which is at a lower level than upper mold 36 when mold opening/closing device 6 is inclined. Extruder 4 is provided for supplying parison 38. Extruder 4 has die head 16. Parison control device 70 is attached to die head 16 of extruder 4 which is used to supply parison 38. Die head 16 has nozzle 14. Nozzle 14 is located near and above the upper end of the groove cut in lower mold 34. More precisely, nozzle 14 is located above the upper end of the cavity defined by lower mold 34 and upper mold 36 clamped together and held by mold opening/closing device 6 inclined at a predetermined angle to a horizontal plane.

Numerical control device 48 is provided for driving devices 62 and 64 for driving cross-table 60. Numerical control device 48 comprises memory unit 50 and control unit 52. Memory unit 50 can store the data showing the size and shape of a pipe or a duct which is to be blow-molded and which has a complex shape. Control unit 52 can supply drive signals to devices 62 and 64, in accordance with the data read out of memory unit 50.

Figure 9:
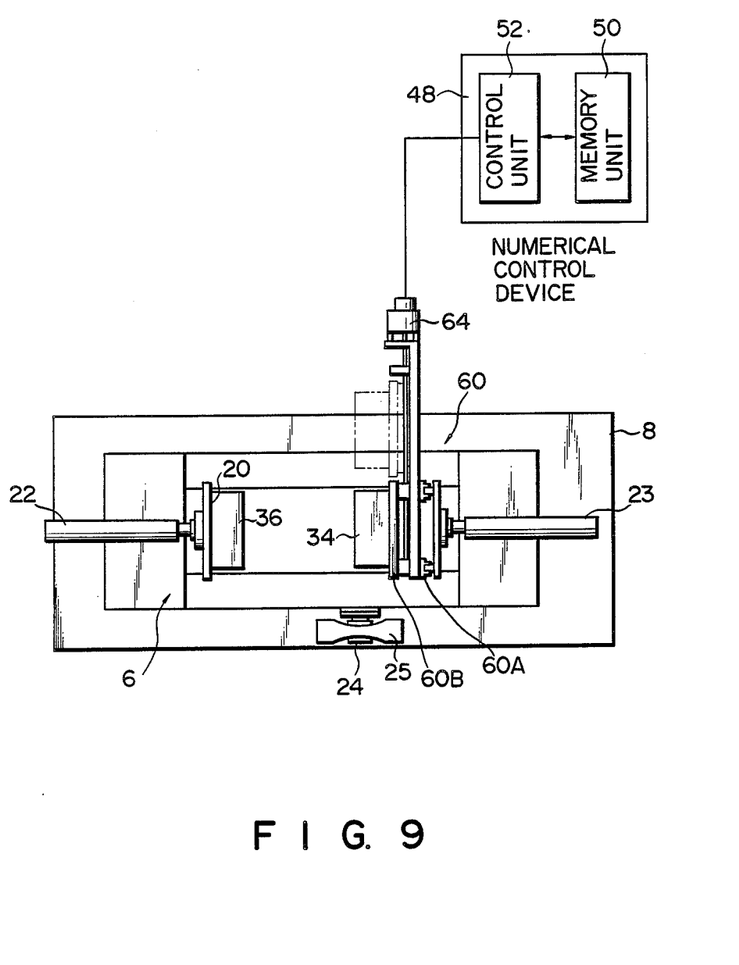
FIG. 9 is a plan view of the apparatus shown in FIG. 8.

As is shown in FIGS. 8 and 9, cross-table 60 comprises Y-table 60A and X-table 60B. Y-table 60B can move up and down in the plane perpendicular to the direction in which upper mold 36 is moved. X-table 60B can move left to right, and vice versa, in this plane. Cross-table 60 can be replaced by a one-stroke type table.

The operation of the blow-molding apparatus of the third embodiment will now be explained.

Upper mold 36 is attached to plate 20 by means of bolts or the like. Lower mold 34 is fixed to X-table 60B on cross-table 60 by means of bolts or the like. Molds 34 and 36 have grooves which define a cavity identical in shape to a hollow article to be blow-molded, when molds 34 and 36 are clamped together.

Then, the data representing the size and shape of the hollow article is read out from memory unit 50 of numerical control device 48, and is supplied to control unit 52 of control device 48. Control unit 52 supplies drive signals to devices 62 and 64.

The angle of inclination of device 6 is changed when a hollow article of a different shape is to be manufactured. As long as a parison is supplied continuously in order to produce hollow articles all of the same shape, the angle of inclination is maintained at an appropriate setting.

Figure 10:
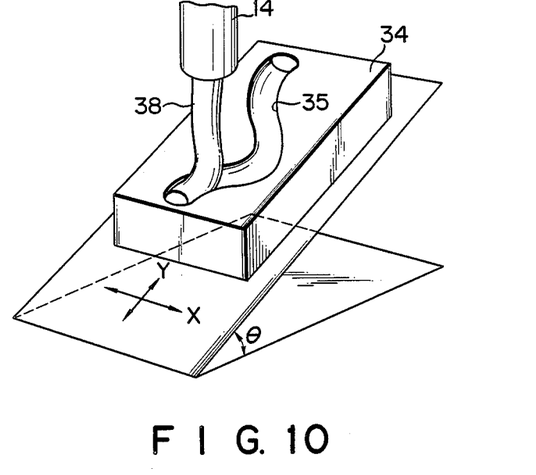
FIGS. 10 and 11 are perspective views, each showing a lower mold moving on a plate, with the parison being supplied into the groove cut in the lower mold.
Figure 11:
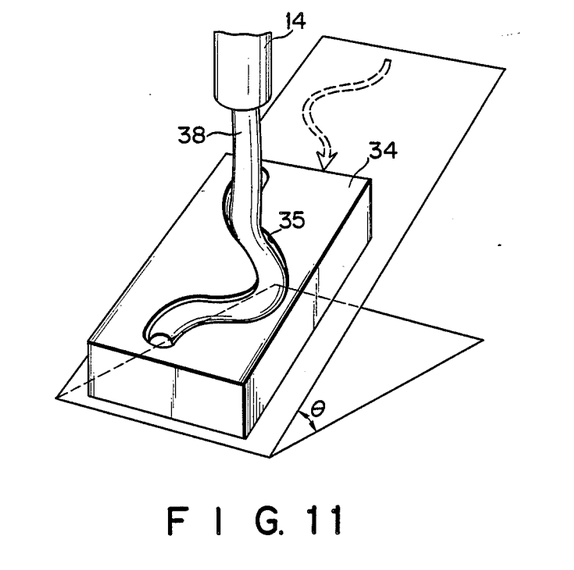

Thereafter, as is shown in FIG. 10, lower mold 34 is set such that the lower end of its groove 35 is positioned directly below nozzle 14. Extruder 4 is actuated, thereby supplying parison 38 having a diameter smaller than that of groove 35, such the lower end of parison 38 first enters the lower end of groove 35. As parison 38 is further extruded from nozzle 14, drive devices 62 and 64 drive Y-table 60A and X-table 60B of cross-table 60, in Y- and X-directions for appropriate distances, whereby bending groove 35 is positioned directly below nozzle 14 throughout the parison-supplying process. When groove 35 has been completely filled with parison 38, extruder 4 is stopped, whereby the supply of parison 38 ceases.

Now that groove 35 is completely filled with parison 38, hydraulic cylinders 22 and 23 are operated, thereby moving upper mold 36 toward lower mold 34, thereby clamping the two molds together. Upper mold 36 also has a groove (not shown) having a shape which is complementary to that of groove 35 of lower mold 34. Molds 34 and 36 clamped together, therefore, define a cavity identical in shape to the desired hollow article to be blow-molded. Parison 38 is held within this cavity.

Next, pressurized air is blow from an air nozzle (not shown) into parison 38 through the lower end thereof, which projects from molds 34 and 36 fastened together. Parison 38 is thereby blow-molded into a hollow article having the desired shape. Parison 38 is then cut at the proximal end located below nozzle 14.

Alternatively, parison 38 can be cut at a position close to nozzle 14 of extruder 4 when lower mold 34 and upper mold 36 are clamped together, and parison 38 is thus held within the cavity defined by these molds. Pressurized air is then blown from an air nozzle (not shown) into parison 38, through the opening in the cut end of parison 38, thereby blow-molding parison into a hollow article.

Finally, hydraulic cylinder device 22 is actuated when air-blown parison 38 (i.e., the hollow article) has cooled sufficiently. Upper mold 36 is, therefore, separated from lower mold 34, thus exposing the hollow article, which is then removed from lower mold 34.

As has been described above, the blow-molding apparatus according to the third embodiment of the invention can manufacture hollow articles having no flashing.

Any embodiment described above can manufacture straight hollow articles, such as straight bottles, cylindrical tanks, by means of blow molding, in the following manner.

First, both molds 34 and 36 are attached to device 6, and are clamped together, thereby forming a straight cavity. Platform 8 is then moved in a horizontal plane, thereby positioning the upper end of the cavity directly below nozzle 14.

Then, parison 38 is supplied from nozzle 14 into the cavity. After the cavity has been completely filled with parison 38, pressurized air is blown into parison 38, thus inflating the parison into a straight hollow article.

Finally, mold 36 is separated from mold 34, thereby exposing the hollow article, which is then removed from mold 36.

Figure 12:
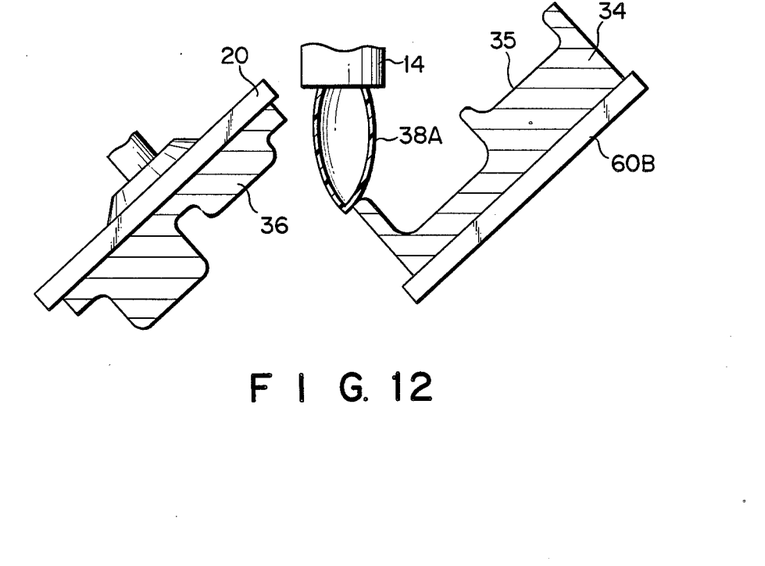
FIGS. 12 to 15 are partial sectional views of upper and lower molds, explaining how, in the apparatus of the third embodiment, a double-walled case is manufactured by linearly moving the lower mold on the plate.
Figure 13:
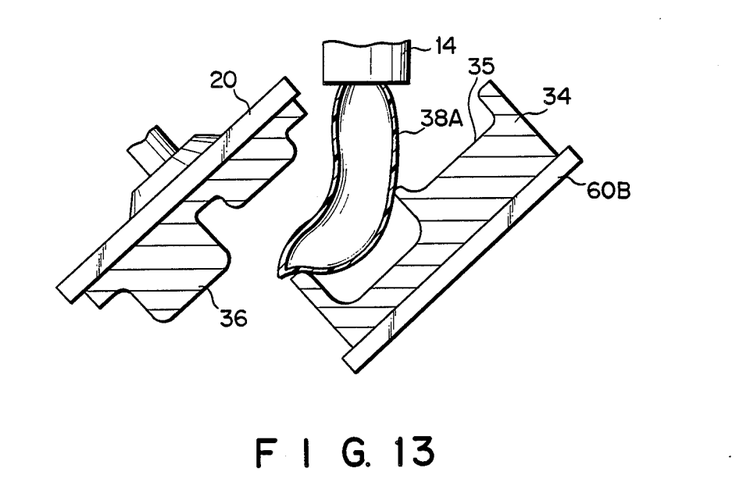
Figure 14:
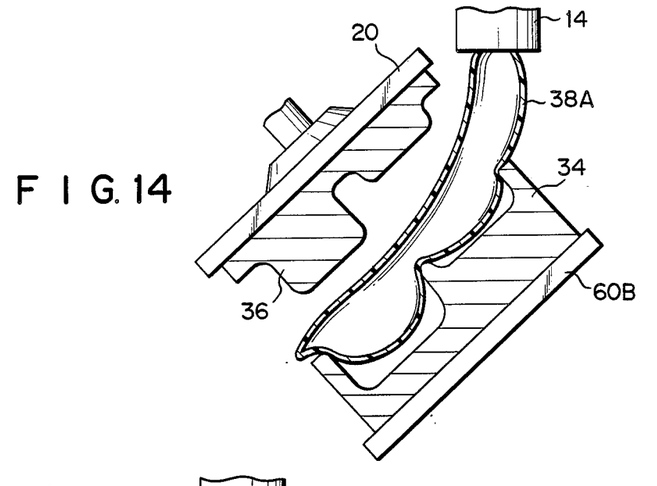
Figures 15, 16:
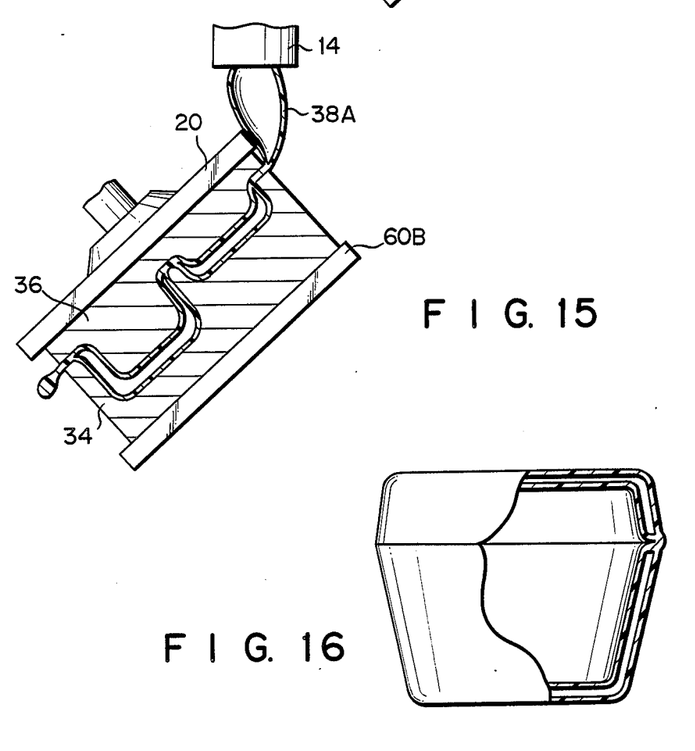
FIG. 16 is a partially section, side view of the double-walled case made by the apparatus of third embodiment.

Any embodiment described above can also produce a double-walled case, such as an attache case. In this instance, as is shown in FIG. 12, the lower end of parison 38 is fused and closed by means of a parison pinch (not shown), thereby forming bottomed parison 38A. An appropriate amount of pressurized air is blown into bottomed parison 38A. Parison 38A is extruded until its distal end protrudes slightly from groove 35 cut in lower mold 34. Parison 38A is extruded further, while Y-table 60A of cross table 60 is moved, thereby moving lower mold 34 for a desired distance in the Y-direction. As a result, supply of parison 38A continues until it extends from the lower end of the groove to the upper end thereof, as is shown in FIGS. 13 and 14. At this time, extruder 4 is stopped, thereby stopping the supply of parison 38A. Then, as is shown in FIG. 15, hydraulic cylinder devices 22 and 23 are operated, thereby clamping molds 34 and 36 together, and fastening parison 38A between these molds. Finally, parison 38A is blow-molded into a double-walled case.

Furthermore, any of the embodiments described above can produce a long, thin hollow article. More specifically, mold opening/closing device 6 is inclined at an appropriate angle. Then, a parison is supplied into the groove cut in the lower mold. Since the parison is not drawn downward, a long hollow article having a uniform wall thickness can be manufactured.

Still further, all of the embodiments described above can produce hollow articles each having an insert therein. First, mold opening/closing device 6 is inclined at a desired angle. Then, an insert is placed in the groove of the lower mold secured to device 6. Thereafter, a parison is supplied into the groove, and the upper mold is clamped to the lower mold. Finally, pressurized air is blown into the parison.

Since the insert is stably placed in a desired portion of the groove of the lower mold inclined upward, the hollow article having an insert can be easily formed.

What is claimed is:

1. A blow-molding apparatus comprising:
   a base member;
   a platform mounted on said base member;
   an extruder provided above said platform and having a nozzle for extruding a parison;
   bearings attached to the upper surface of said platform;
   a shaft supported by said bearings;
   a mold opening/closing device pivotably mounted on said shaft and having a main body, a pair of mold halves supported by the main body and opposing each other, and mold opening/closing means for clamping together or separating said mold halves, said mold halves comprising an upper mold half and a lower mold half; and
   means for rotating said mold opening/closing device around said shaft, thereby to incline said mold halves at an angle, within a predetermined range, to a horizontal direction so that a groove cut in the lower mold half is located below the nozzle thereby allowing a soft parison to be fed smoothly under its own weight into said groove when said mold halves are separated.

2. The blow-molding apparatus according to claim 1, wherein said shaft supporting said mold opening/closing device extends at right angles to the direction in which said mold halves are moved by said mold opening/closing device.

3. The blow-molding apparatus according to claim 2, wherein said means for inclining said mold opening/closing device is attached to said mold opening/closing device so as to lift said upper mold half, while positioning the lower mold half below the nozzle of said extruder, and the main body of said mold opening/closing device is mounted on said shaft located close to the lower mold half.

4. The blow-molding apparatus according to claim 1, wherein said mold opening/closing device has adjusting means for adjusting the position of said lower mold half prior to commencement of blow-molding.

5. The blow-molding apparatus according to claim 1, further comprising platform-moving means secured to said base member, for moving said platform in a horizontal plane perpendicular to the axis of said nozzle.

6. The blow-molding apparatus according to claim 5, wherein said paltform-moving means comprises a first drive device, for moving said platform in a direction parallel to the axis of said shaft, and a second drive device, for moving said platform in a horizontal plane, in a direction at right angles to the axis of said shaft.

7. The blow-molding apparatus according to claim 3, further comprising mold-moving means secured to the main body of said mold opening/closing device, for moving said lower mold half in a plane perpendicular to the direction in which said mold halves are moved toward or away from each other.

8. The blow-molding apparatus according to claim 7, wherein said mold-moving means comprises a first mold-moving device, for moving the mold halves in a direction parallel to the axis of said shaft, and a second mold-moving device, for moving the mold halves in a direction at right angles to the axis of said shaft.

9. The blow-molding apparatus according to claim 7, wherein said mold-moving means is an X-Y crosstable able to move in two directions.

10. The blow-molding apparatus according to claim 9, wherein said X-Y cross-table is a numericaly controlled one-stroke type.

* * * * *